D. & H. WOLF.
Seed Planter.
No. 9,589.
Patented Feb. 15, 1853.
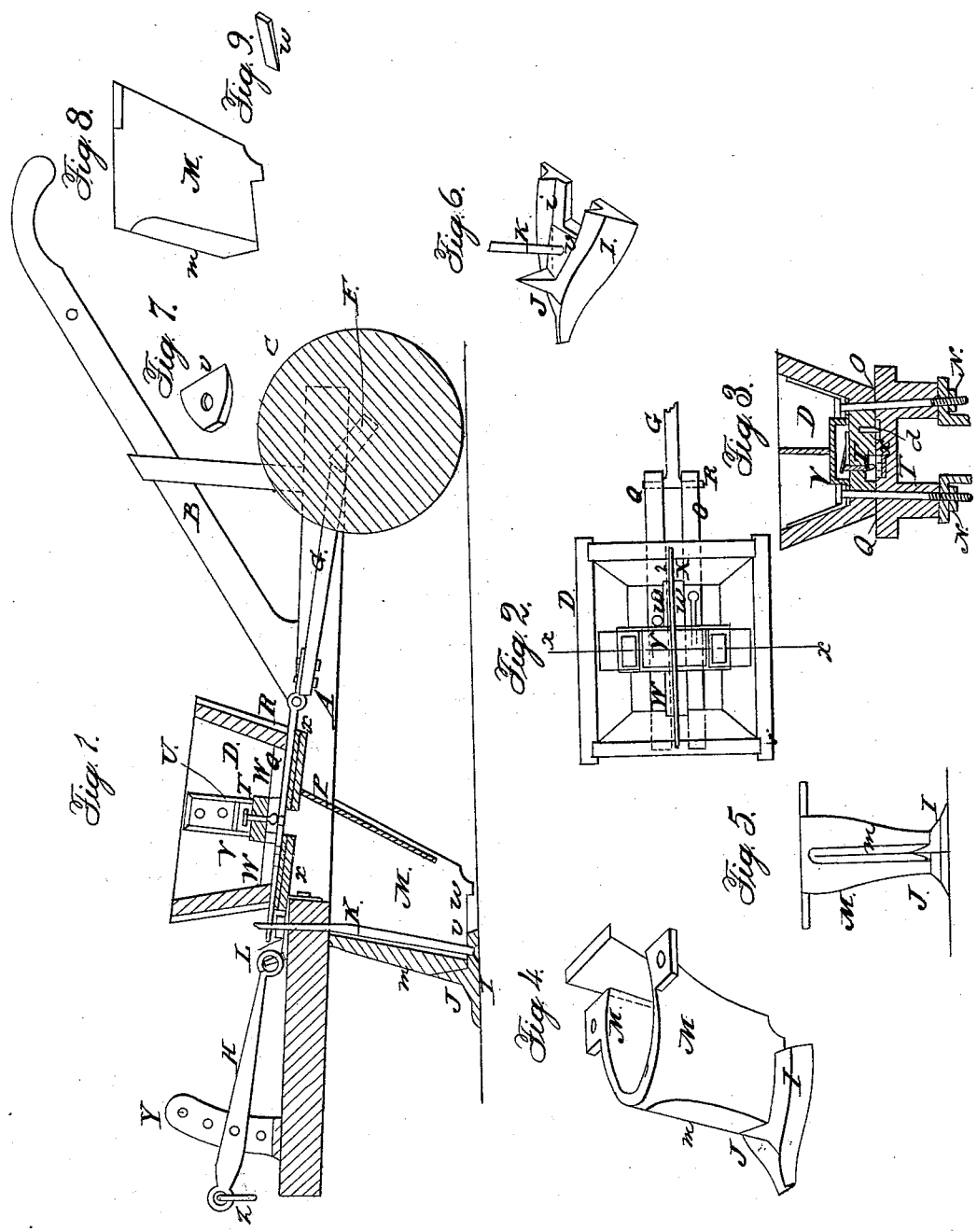

UNITED STATES PATENT OFFICE.

DAVID WOLF AND HERMAN WOLF, OF LEBANON TOWNSHIP, PENNSYLVANIA.

IMPROVEMENT IN SEED-PLANTERS.

Specification forming part of Letters Patent No. 9,589, dated February 15, 1853.

*To all whom it may concern:*

Be it known that we, DAVID WOLF and HERMAN WOLF, of Lebanon township, in the county of Lebanon and State of Pennsylvania, have invented certain new and useful improvements on the machine for planting corn and other seed intermixed with manure; and we do hereby declare the following to be a full, clear, and exact description of the construction and operation of the same, reference being had to the annexed drawings, making part of this specification.

Figure 1 represents a vertical longitudinal section of the machine. Fig. 2 is a horizontal projection of the hopper and slides. Fig. 3 is a vertical transverse section on the line $x\,x$ of Fig. 2. Fig. 4 is a perspective view of the tubular drill-tooth and flanges by which it is fastened to the beam. Fig. 5 is a front elevation of the same. Fig. 6 is a perspective view of the share, cutter, and portion of the confining bolt or rod. Fig. 7 is a perspective view of the wedge to be slipped over the confining-rod between the share and tube to change the position of the share. Fig. 8 is an elevation of the outer side of one-half of the tooth; Fig. 9, one of the wedges to be inserted between the heels of the share and tube to alter the position of the share for deeper or shallower plowing.

Similar letters refer to the corresponding parts in the several figures of the drawings.

The frame A, handles B, roller C, hopper D, slides O Q, crank-shaft F, connecting-rod G, and draft-bar H, being made and arranged in a manner somewhat similar to our patented machine of June 3, 1851, need not therefore be particularly described in this application.

The improvements which we have made on our patented machine, and of which we desire to secure the exclusive use, relate particularly to the double-edged adjustive share employed in combination with the tubular drill-tooth or hollow plow; also, to the form of the tubular tooth or plow for opening the furrows; likewise to the arrangement of the longitudinal blocks on either side of the bridge to guide the seed into the openings in the feed-slides, and to prevent oblong grains of seed from crossing the openings, and thus obstruct the free discharge of the seed; also, the arrangement of the clearers for keeping the openings in the slides always free from choking. The double-edged share I is in its external form something like a pointed shovel, having a triangular projection, J, to the same, which rises in front and covers a portion of the tube, and serves as a cutter. It rests against the fore part of the tube and strengthens its connection with the same. In the upper side is formed a recess, $i$, Fig. 6, of the same size and shape as the bottom of the tubular plow, which is secured therein by a strong rod, K, passing vertically through the middle of the share and through the tube and beam, and through an iron plate resting upon the beam, said rod having a flat head which rests in a hole countersunk in the bottom of the share, and a screw-thread cut on its upper end, on which is screwed a nut, L, to confine the share to the tube and the tube to the beam by screwing the nut down upon the plate.

The drill-tube or plow M is cast in one piece in the form represented in Fig. 4, having two mold-boards cast in one piece ten inches high from the flanges to the heels, nine inches from front to rear at top, and seven inches at bottom, each mold-board having a heel against which the share rests firmly, scalloped or sloped behind and turned inward to a width of about two inches, in order to cause the earth to fall back into the furrow after the mold-boards have turned it to the right and left, and the seed has descended into the furrow, thus causing the seed to be covered without the use of separate shovels or covers following the tubular plow. The front of the tubular plow above the place where the nose of the share rests is shod or faced with steel at $m$, to prevent wearing away too rapidly. The tubular plow is confined to the under side of the beam by means of screw-bolts passing down through bent iron plates and flanges of the cap-plate of the clearers, and through the bottom of the hopper and through the frame, the heads of said bolts resting firmly upon the said cap-plate, and the nuts N screwed firmly against the flanges of the plow, as seen in Fig. 3. The main strength of the fastening, however, is the long rod K', passing through the share and beam.

Grooves or channels M' are formed on the inner surfaces of the wings M of the tubular plow, for the insertion of a thin metallic plate, P, Fig. 1, which serves the purpose of closing the space between the wings, and thus forming a tube, said plate standing at an angle of about seventy degrees, with a horizontal plane, and receiving the grain upon its inclined surface as its descends from the hopper and conducting it into the furrow. This plate is made of a shape corresponding with the shape of the space between the wings of the plow. It is a little wider, in order to enter the before-mentioned grooves. It extends from the bottom of the hopper to within a few inches of the heels of the plow, so as to conduct all the grain into the furrow. The perforated feeding-slide Q, working in the seed-apartment, and the slide O, which works in the manure, apartment of the hopper, are connected together by a pin or link, R, to which the connecting-rod G of the crank-shaft is attached, which does away with the second crank and connecting-rod of the former machine.

The openings for the seed to pass through are made in the usual manner as to size, shape, and position, and are disposed according to the kind of grain required to be planted and the manner in which the farmer desires to distribute the seed.

In one of the slides oblong slits are made, extending from one opening to another, into which slits the stationary clearer is introduced, and over which the slide will move in its back and forward traverse or movement, and thus keep the spaces free from clogging or choking. This clearer is inserted permanently into the bridge in the hopper, and extends down below the same far enough to enter the apertures and slits in the slide. There is also a rising-and-falling clearer, T, moving up and down in a vertical opening in the bridge, being held down upon the slide by means of a flat spring, U, fastened to the bridge and made to bear against the upper end of the pin, so that as the slide reciprocates or moves back and forth the clearer rises and falls, forcing the seed through and keeping the apertures from choking. This spring is covered with a cap, V, which prevents the seed in the hopper from coming in contact with it. The lower end of the clearer is rounded, so that the slide, as it moves, will cause it to rise from the seed-aperture, while the spring U will again force it down, and in this way the clearer is made to serve an important office in this seeding-machine.

Longitudinally and at right angles to the transverse bridge in the hopper, and between the slides, is arranged a blocking or wall, W, about half the height of the bridge, extending the entire length from the bridge to the inclined side of the hopper over the side, being of such width as to nearly fill the spaces between the seed-apertures in the slide, said blocking being designed to guide the seed into the apertures of the feed-slides.

The hopper is divided longitudinally by a thin partition, $X^2$, into two apartments, one for the seed and one for fine manure, such as ground plaster, lime, or guano.

The operation of this seeding-machine is similar to our patented machine. The seed is put into one division of the hopper and the fine manure into the other division. The team is hitched to the ring Z of the adjustive drag-bar and driven forward. The roller C turns upon the ground and revolves the crank F. This reciprocates the slides O Q, conveying the grain and manure to the opening in the bottom of the hopper and dropping them through upon the inclined conducting-plate P, which conveys them into the furrow, where they are covered by the earth falling around behind the heels of the plow. When the share I is worn away it is replaced by another with a triangular projection or cutter, J, similar to that before described. Should it be desired to plow shallower or deeper, it is effected by wedges $v$ $w$, introduced between the share and plow, or by changing the position of the drag-bar H on the segmental perforated bar Y. The machine is guided by the handles in the usual manner.

The operation of the clearers being already sufficiently explained in giving a description of them need not therefore be more particularly set forth.

The recess $i$ on the upper side of the share or shoe is made of a uniform depth from the fore end back to near the middle. It then descends or slopes off to near the hind end to receive the wedge $w$ for adjusting the share to the degree of cutting or depth of plowing desired.

Long narrow metallic plates $x$ of various thicknesses are, when required, inserted into the grooves in which the slide Q reciprocates beneath the same, so that said plates may be withdrawn in order to insert distributing-slides of various thicknesses, and perforated for different kinds of planting.

Having described the construction and operation of our invention and improvements, what we claim as new, and desire to secure by Letters Patent, is—

The movable clearer T, arranged and operating in the manner and for the purpose herein set forth, and represented in Fig. 3.

In testimony whereof we have hereunto signed our names before two subscribing witnesses.

DAVID WOLF.
HERMAN WOLF.

Witnesses:
JACOB WEIDLE,
SUNWEISS COSSER.